(12) United States Patent
Garner

(10) Patent No.: US 10,210,863 B2
(45) Date of Patent: Feb. 19, 2019

(54) RECEPTION OF AUDIO COMMANDS

(71) Applicant: ROKU, Inc., Los Gatos, CA (US)

(72) Inventor: Gregory M. Garner, Saratoga, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 15/341,552

(22) Filed: Nov. 2, 2016

(65) Prior Publication Data

US 2018/0122373 A1 May 3, 2018

(51) Int. Cl.
| | |
|---|---|
| *G10L 15/22* | (2006.01) |
| *G10L 15/08* | (2006.01) |
| *G10L 15/30* | (2013.01) |
| *H04R 1/40* | (2006.01) |
| *H04R 3/00* | (2006.01) |
| *G10L 21/02* | (2013.01) |

(52) U.S. Cl.
CPC .............. *G10L 15/22* (2013.01); *G10L 15/08* (2013.01); *G10L 15/30* (2013.01); *H04R 1/406* (2013.01); *H04R 3/005* (2013.01); *G10L 21/02* (2013.01); *G10L 2015/088* (2013.01); *G10L 2015/223* (2013.01)

(58) Field of Classification Search
CPC .............. G06F 3/16; H04R 3/00; H04R 13/42
See application file for complete search history.

(56) References Cited

U.S. PATENT DOCUMENTS

| | | | | |
|---|---|---|---|---|
| 7,072,686 | B1* | 7/2006 | Schrager | H04M 1/72519 |
| | | | | 379/88.01 |
| 9,689,960 | B1* | 6/2017 | Barton | G01S 3/8083 |
| 2004/0066941 | A1* | 4/2004 | Amada | G01S 3/8083 |
| | | | | 381/98 |
| 2007/0291956 | A1* | 12/2007 | Loether | H04R 27/00 |
| | | | | 381/80 |
| 2008/0154613 | A1 | 6/2008 | Haulick et al. | |
| 2009/0243909 | A1 | 10/2009 | Reams et al. | |
| 2011/0261950 | A1* | 10/2011 | Yamaguchi | H03H 21/0027 |
| | | | | 379/406.08 |
| 2012/0062729 | A1* | 3/2012 | Hart | G06F 1/1626 |
| | | | | 348/135 |

(Continued)

OTHER PUBLICATIONS

International Search Report and Written Opinion of the International Searching Authority for International Application No. PCT/US17/50629, dated Sep. 27, 2017 (14 pages).

*Primary Examiner* — Shreyans A Patel
(74) *Attorney, Agent, or Firm* — Sterne, Kessler, Goldstein & Fox, PLLC

(57) ABSTRACT

Disclosed herein are system, apparatus, article of manufacture, method and/or computer program product embodiments, and/or combinations and sub-combinations thereof, for controlling a media device and a display device using audio commands. In so doing, some embodiments operate to suppress noise from the display device, and enhance audio commands from users. Some embodiments operate by determining a position of the display device and de-enhancing audio from the display device based on the display device position. The position of the user is determined, and audio from the user based on the user position is enhanced. Then, a command in the enhanced user audio is identified, and the media device and/or the display device are caused to operate according to the command.

20 Claims, 6 Drawing Sheets

(56) References Cited

U.S. PATENT DOCUMENTS

| | | |
|---|---|---|
| 2012/0146788 A1 | 6/2012 | Wilson et al. |
| 2012/0224714 A1* | 9/2012 | Couse .................... H04R 1/406 |
| | | 381/92 |
| 2013/0238326 A1* | 9/2013 | Kim ........................ G06F 3/167 |
| | | 704/231 |
| 2014/0278437 A1 | 9/2014 | Shen et al. |
| 2014/0337016 A1* | 11/2014 | Herbig ...................... G06T 7/73 |
| | | 704/201 |
| 2015/0036573 A1 | 2/2015 | Malik et al. |
| 2015/0194152 A1* | 7/2015 | Katuri ..................... G10L 15/22 |
| | | 704/231 |
| 2015/0296289 A1* | 10/2015 | Lakkundi ............... H04R 3/005 |
| | | 381/92 |
| 2016/0099007 A1* | 4/2016 | Alvarez ................ G10L 21/034 |
| | | 704/225 |
| 2016/0148614 A1* | 5/2016 | Yoon ....................... G10L 15/20 |
| | | 704/233 |
| 2017/0289678 A1 | 10/2017 | Melanson et al. |
| 2018/0025001 A1 | 1/2018 | Patel et al. |
| 2018/0077233 A1 | 3/2018 | Chang et al. |
| 2018/0122373 A1 | 5/2018 | Gamer et al. |

\* cited by examiner

RECEPTION OF AUDIO COMMANDS

BACKGROUND

Field

This disclosure is generally directed to improved reception of audio commands in electronic devices that operate according to such audio commands.

BACKGROUND

Some electronic devices operate according to audio commands issued by human operators. But a number of factors may impede an electronic device's ability to receive and respond to audio commands. For example, the presence of noise may negatively impact an electronic device's ability to clearly receive and recognize an audio command, thereby preventing the electronic device from performing the command, or causing the electronic device to perform the incorrect command.

SUMMARY

Provided herein are system, apparatus, article of manufacture, method and/or computer program product embodiments, and/or combinations and sub-combinations thereof, for controlling a media device and/or a display device using audio commands. In so doing, some embodiments operate to suppress noise from the display device (or other sources of noise), and enhance audio commands from users (or other sources of audio commands).

While embodiments are described with respect to the example of controlling display devices and/or media devices in a media streaming environment, these embodiments are applicable to the audio control of any electronic devices in any environment.

Some embodiments operate by determining a position of the display device and de-enhancing audio from the display device based on the display device's position. The position of the user is determined, and audio from the user based on the user position's is enhanced. Then, a command in the enhanced user audio is identified, and the media device and/or the display device are caused to operate according to the command.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
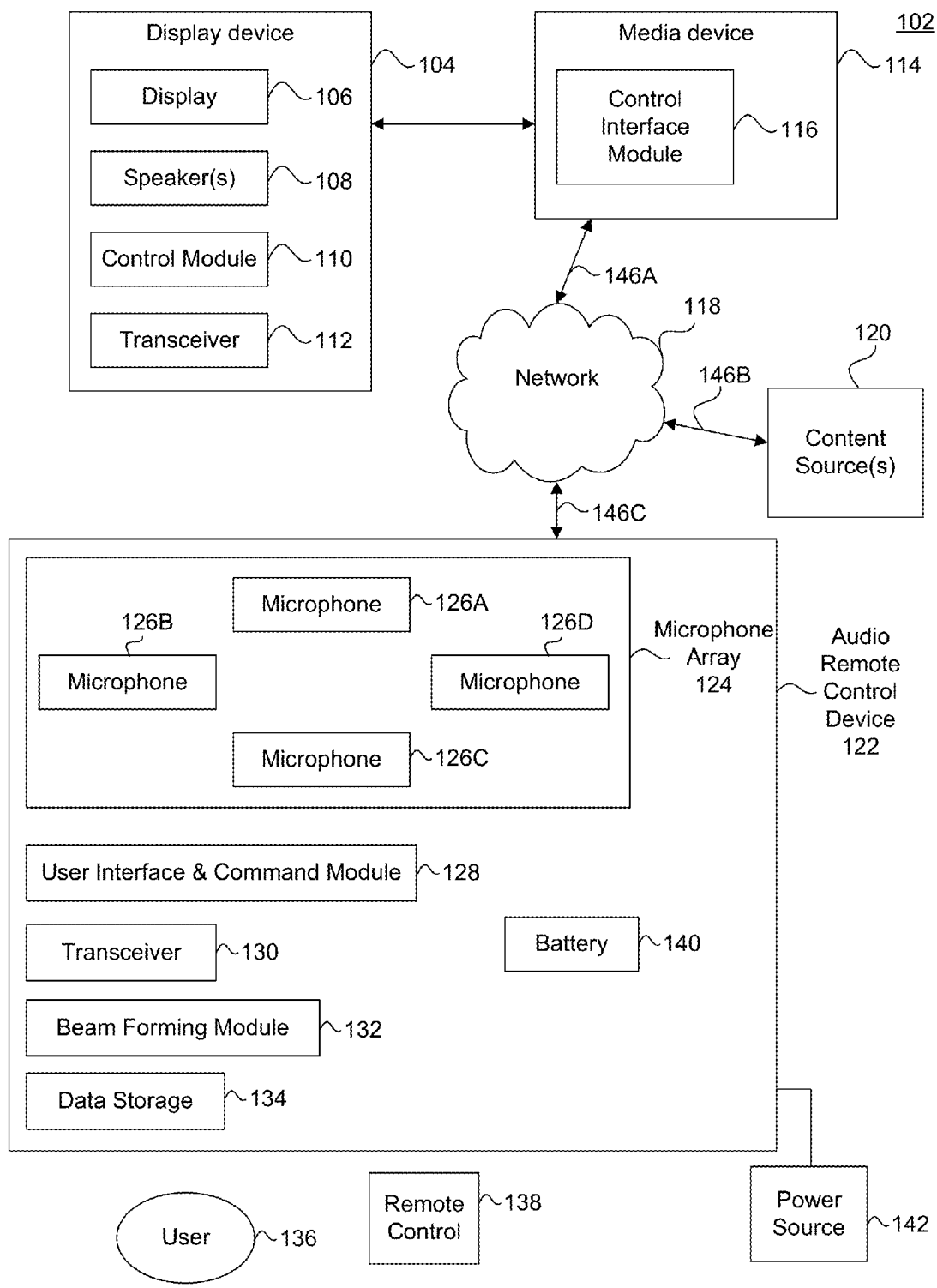
FIG. 1 illustrates a block diagram of a data processing system that includes an audio responsive electronic device, according to some embodiments.

FIG. 1 illustrates a block diagram of a data processing system 102, according to some embodiments. In a non-limiting example, data processing system 102 is a media system 102.

The media system 102 may include a display device 104 (e.g. monitors, televisions, computers, phones, tablets, projectors, etc.) and a media device 114 (e.g. streaming devices, multimedia devices, audio/video playback devices, etc.). In some embodiments, the media device 114 can be a part of, integrated with, operatively coupled to, and/or connected to display device 104. The media device 114 can be configured to communicate with network 118. In various embodiments, the network 118 can include, without limitation, wired and/or wireless intranet, extranet, Internet, cellular, Bluetooth and/or any other local, regional, global communications network, as well as any combination thereof.

The media system 102 also includes one or more content sources 120 (also called content servers 120). Content sources 120 may each store music, videos, movies, TV programs, multimedia, images, still pictures, text, graphics, gaming applications, advertisements, software, and/or any other content in electronic form.

The media system 102 may include a user 136 and a remote control 138. Remote control 138 can be any component, part, apparatus or method for controlling media device 114 and/or display device 104, such as a remote control, a tablet, laptop computer, smartphone, on-screen controls, integrated control buttons, or any combination thereof, to name just a few examples.

The media system 102 may also include an audio remote control device 122. Audio remote control device 122 may receive audio commands from user 136 or another source of audio commands (such as but not limited to the audio of content output by speaker(s) 108 of display device 104). Audio remote control device 122 may transmit control signals corresponding to such audio commands to media device 114, display device 104, and/or any other component in system 102, to cause the media device 114, display device 104, and/or other component to operate according to the audio commands.

The display device 104 may include a display 106, speaker(s) 108, a control module 110 and transceiver 112. Control module 110 may receive and respond to commands from media device 114, remote control 138 and/or audio remote control 122 to control the operation of display device 104, such as selecting a source, varying audio and/or video properties, adjusting volume, powering on and off, to name just a few examples. Control module 110 may receive such commands via transceiver 112. Transceiver 112 may operate according to any communication standard or technique, such as infrared, cellular, WIFI, Blue Tooth, to name just a few examples.

Media device 114 may include a control interface module 116 for sending and receiving commands to/from display device 104, remote control 138 and/or audio remote control 122.

In operation, user 136 may use remote control 138 or audio remote control 122 to interact with media device 114 to select content, such as a movie, TV show or song. Media device 114 requests the selected content from content source(s) 120 over the network 118. Content source(s) 120 transmit the requested content to media device 114. Media device 114 transmits the content to display device 104 for playback using display 106 and/or speakers 108. User 136 may use remote control 138 or audio remote control 122 to change settings of display device 104, such as changing the volume, the source, the channel, display and audio settings, to name just a few examples.

In an embodiment, the user 136 may enter commands on remote control 138 by pressing buttons or using a touch screen on remote control 138, such as channel up/down, volume up/down, play/pause/stop/rewind/fast forward, menu, up, down, left, right, to name just a few examples.

In an embodiment, the user 136 may also or alternatively enter commands using audio remote control device 122 by speaking a command. For example, to increase the volume, the user 136 may say "Volume Up." To change to the immediately preceding channel, the user 136 may say "Channel down." In an embodiment, the user 136 may be required to say a trigger word before saying commands, to better enable the audio remote control 122 to distinguish between commands and other spoken words. For example, the trigger word may be "Command." In this case, to increase the volume, the user 136 may say "Command Volume Up." In an embodiment, there may be one or more trigger words that are recognized by audio remote control device 122.

In some embodiments, the audio remote control 122 may include a microphone array 124 comprising one or more microphones 126. The audio remote control 122 may also include a user interface and command module 128, transceiver 130, beam forming module 132 and data storage 134.

User interface and command module 128 may receive audio input via microphone array 124. The audio input may be from user 136, display device 104 (via speakers 108), or any other audio source in system 102. User interface and command module 128 may analyze the received audio input to recognize trigger words and commands, using any well known signal recognition techniques, procedures, technologies, etc. The user interface and command module 128 may generate command signals compatible with display device 104 and/or media device 114 corresponding to the recognized commands, and transmit such commands to display device 104 and/or media device 114 via transceiver 130, to thereby cause display device 104 and/or media device 114 to operate according to the commands. Transceiver 130 may operate according to any communication standard or technique, such as infrared, cellular, WIFI, Blue Tooth, to name just a few examples. Audio remote control device 122 may be powered by a battery 140, or via an external power source 142 (such as AC power, for example).

Figure 2:
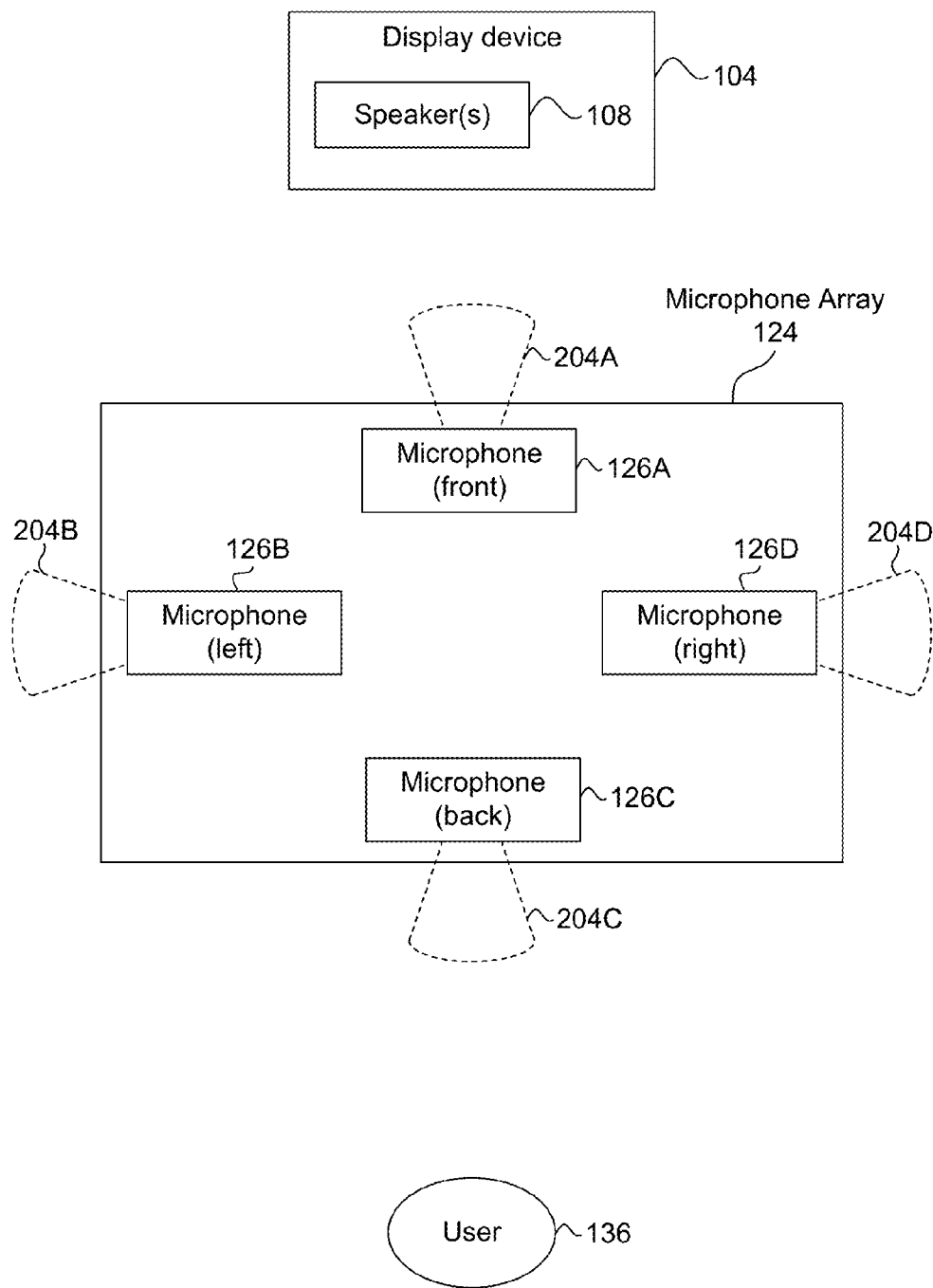
FIG. 2 illustrates a block diagram of a microphone array having a plurality of microphones, shown oriented relative to a display device and a user, according to some embodiments.

FIG. 2 illustrates a block diagram of microphone array 124 of the audio remote control device 122, shown in an example orientation relative to the display device 104 and the user 136, according to some embodiments. In the example of FIG. 2, the microphone array 124 includes four microphones 126A-126D, although in other embodiments the microphone array 124 may include any number of microphones 126.

In the example of FIG. 2, microphones 126 are positioned relative to each other in a general square configuration. For illustrative purposes, and not limiting, microphone 126A may be considered at the front; microphone 126D may be considered at the right; microphone 126C may be considered at the back; and microphone 126B may be considered at the left. It is noted that such example designations may be set according to an expected or designated position of user 136 or display device 104, in some embodiments.

As shown in the example of FIG. 2, the user 136 is positioned proximate to the back microphone 126C, and the display device 104 is positioned proximate to the front microphone 126A.

Each microphone 126 may have an associated reception pattern 204. As will be appreciated by persons skilled in the relevant art(s), a microphone's reception pattern reflects the directionality of the microphone, that is, the microphone's sensitivity to sound from various directions. As persons skilled in the relevant art(s) will appreciate, some microphones pick up sound equally from all directions, others pick up sound only from one direction or a particular combination of directions.

In the example orientation of FIG. 2, the front microphone 126A receives audio from speakers 108 of display 104 most clearly, given its reception pattern 204A and relative to the other microphones 204B-204D. The back microphone 126C receives audio from user 136 most clearly, given its reception pattern 204C and relative to the other microphones 126A, 126B and 126D.

Figure 3:
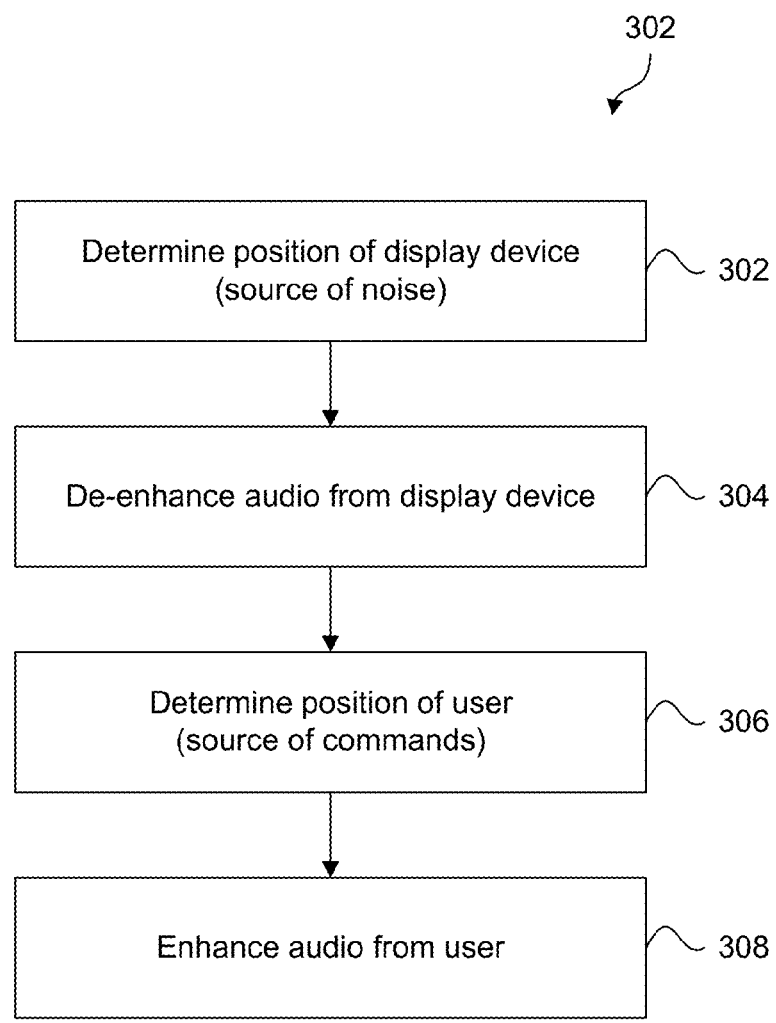
FIG. 3 illustrates a method for enhancing audio from a user and de-enhancing audio from a display device and/or other noise sources, according to some embodiments.

FIG. 3 illustrates a method 302 for enhancing audio from a user (and/or other sources of audio commands) and de-enhancing audio from a display device (and/or other noise sources), according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 302 shall be described with reference to FIGS. 1 and 2. However, method 302 is not limited to those examples.

In 302, the position of a source of noise may be determined. For example, user interface and command module 128 of the audio remote control device 122 may determine the position of display device 104. In embodiments, display device 104 may be considered a source of noise because audio commands may be expected from user 136 during times when display device 104 is outputting audio of content via speakers 108.

In an embodiment, user 136 may enter configuration settings specifying where the display device 104 is positioned proximate to one of the microphones 126 (such as the front microphone 126A in the example orientation of FIG. 2). Such configuration settings may be stored in data storage 134 of the audio remote control device 122. Accordingly, in 302, user interface and command module 128 may access the configuration settings in data storage 134 to determine the position of display device 104.

In 304, audio from the source of noise may be de-enhanced or suppressed. For example, user interface and command module 128 may deactivate microphones 126 proximate to the display device 104 and having reception patterns 204 most likely to receive audio from display device 104. Specifically, in the example of FIG. 2, user interface and command module 128 may deactivate the front microphone 126A, and potentially also the right microphone 126D and/or the left microphone 126B.

Alternatively or additionally, beam forming module 132 in the audio remote control device 122 may use beam forming techniques on any of its microphones 126 to deemphasize reception of audio from the display device 104. For example, beam forming module 132 may adjust the reception pattern 204A of the front microphone 126A (and potentially also reception patterns 204D and 204B of the right microphone 126D and the left microphone 126) to suppress or even negate the receipt of audio from display device 104. Beam forming module 132 may perform this functionality using any well known beam forming technique, operation, process, module, apparatus, technology, etc.

Alternatively or additionally, user interface and command module 128 may issue a command via transceiver 130 to display device 104 to mute display device 104. In some embodiments, user interface and command module 128 may mute display device 104 after receiving and recognizing a trigger word. The user interface and command module 128 may operate in this manner, since user interface and command module 128 expects to receive one or more commands from user 136 after receiving a trigger word.

Figure 4:
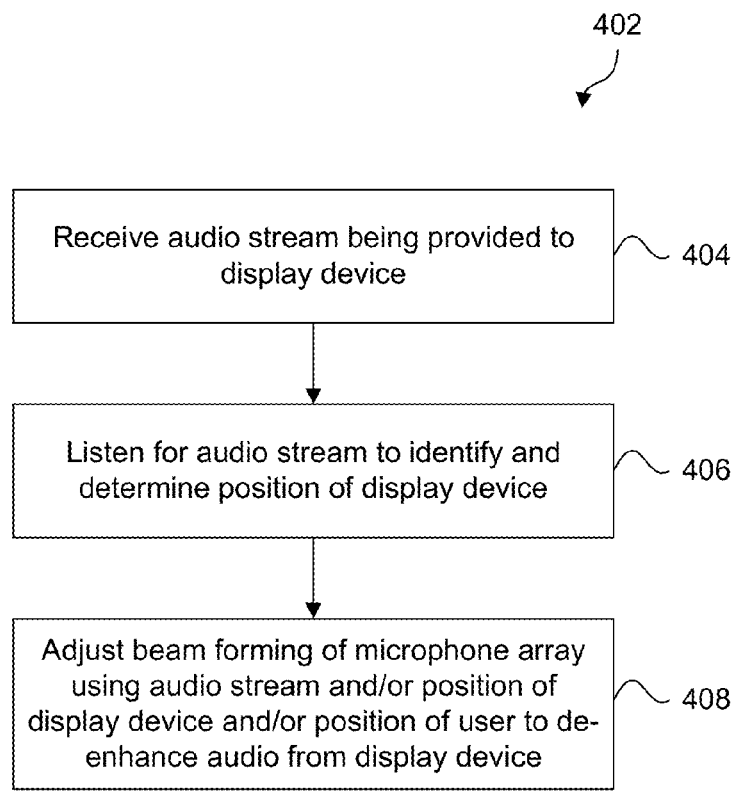
FIG. 4 illustrates a method for de-enhancing audio from a display device and/or other noise sources, according to some embodiments.

FIG. 4 illustrates an alternative or additional embodiment for implementing elements 302 and 304 in FIG. 3. In 404, user interface and command module 128 in the audio remote control device 122 receives the audio stream of content being also provided to display device 104 from media device 114, for play over speakers 108. User interface and command module 128 may receive this audio stream from media device 114 via network 118 using, for example, WIFI, Blue Tooth, cellular, to name a few communication examples. User interface and command module 128 could also receive this audio stream from content source(s) 120 over network 118.

In 406, user interface and command module 128 may listen for audio received via microphone array 124 that matches the audio stream received in 404, using well known signal processing techniques and algorithms.

In 408, user interface and command module 128 may adjust the reception patterns 204 of those microphones 126 that received the matched audio stream, to suppress or even null audio reception of those microphones 126. For example, in 408, user interface and command module 128 may identify the microphones 126 where the signal amplitude (or signal strength) was the greatest during reception of the matched audio stream (such as the front microphone 126A in the example orientation of FIG. 2), and then operate with beam forming module 132 to suppress or null audio reception of those microphones 126 using well known beam forming techniques.

Alternatively or additionally, user interface and command module 128 in 408 may subtract the matched audio received in 406 from the combined audio received from all the microphones 126 in microphone array 124, to compensate for noise from the display device 104.

In some embodiments, the operations depicted in flowchart 402 are not performed when audio remote control device 122 is powered by the battery 140 because receipt of the audio stream in 404 may consume significant power, particularly if receipt is via WIFI or cellular. Instead, in these embodiments, flowchart 402 is performed when audio remote control device 122 is powered by an external source 142.

Referring back to FIG. 3, in 306, the position of a source of commands may be determined. For example, in some embodiments, user interface and command module 128 of the audio remote control device 122 may determine the position of user 136, since user 136 may be considered to be the source of commands.

In an embodiment, user 136 may enter configuration settings specifying the user 136 is the source of commands, and is positioned proximate to one of the microphones 126 (such as the back microphone 126C in the example orientation of FIG. 2). Accordingly, in 306, user interface and command module 128 may access the configuration settings in data storage 134 to determine the position of user 136.

In 308, audio from the source of commands may be enhanced. For example, user interface and command module 128 may enhance the audio sensitivity of microphones 126 proximate to the user 136 and having reception patterns 204 most likely to receive audio from user 136, using beam forming techniques. With regard to the example of FIG. 2, the user interface and command module 128 may use well known beam forming techniques to adjust the reception pattern 204C of back microphone 126C to enhance the ability of back microphone 126C to clearly receive audio from user 136.

Figure 5:
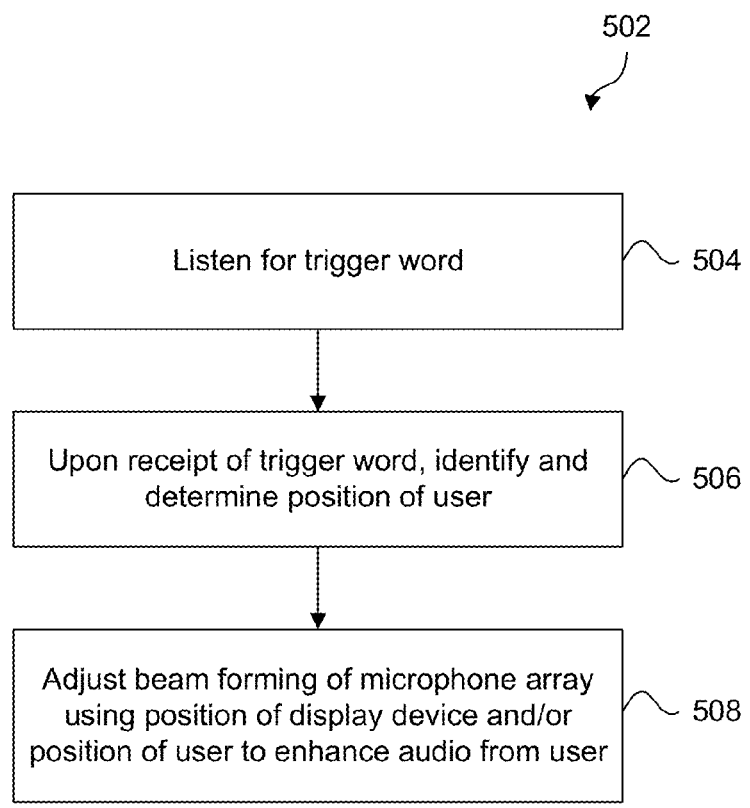
FIG. 5 illustrates a method for enhancing audio from a user, according to some embodiments.

FIG. 5 illustrates a method 502 for enhancing audio from a user, according to some embodiments. In some embodiments, method 502 is an alternative implementation of elements 306 and/or 308 in FIG. 3.

In 504, the user interface and command module 128 in the audio remote control device 122 receives audio via microphone array 124, and uses well know speech recognition technology to listen for any predefined trigger word.

In 506, upon receipt of a trigger word, user interface and command module 128 determines the position of the user 136. For example, in 506, user interface and command module 128 may identify the microphones 126 where the signal amplitude (or signal strength) was the greatest during reception of the trigger word(s) (such as the back microphone 126C in the example of FIG. 2), and then operate with beam forming module 132 to adjust the reception patterns 126 of the identified microphones 126 (such as reception pattern 126C of the back microphone 126C) to enhance audio sensitivity and reception by those microphones 126. In this way, user interface and command module 128 may be able to better receive audio from user 136, to thus be able to better recognize commands in the received audio. Beam forming module 132 may perform this functionality using any well known beam forming technique, operation, process, module, apparatus, technology, etc.

In embodiments, trigger words and commands may be issued by any audio source. For example, trigger words and commands may be part of the audio track of content such that the speakers 108 of display device 104 may audibly output trigger words and audio commands as the content (received from media device 114) is played on the display device 104. In an embodiment, such audio commands may cause the media device 114 to retrieve related content from content sources 120, for playback or otherwise presentation via display device 104. In these embodiments, audio remote control device 122 may detect and recognize such trigger words and audio commands in the manner described above with respect to FIGS. 3-5, except in this case the display device 104 is the source of the commands, and the user 136 is a source of noise. Accordingly, with respect to FIG. 3, elements 302 and 304 are performed with respect to the user 136 (since in this example the user 136 is the source of noise), and elements 306 and 308 are performed with respect to the display device 104 (since in this example the display device 104 is the source of audio commands).

In some embodiments, different trigger words may be used to identify the source of commands. For example, the trigger word may be "Command" if the source of commands is the user 136. The trigger word may be "System" if the source of the commands is the display device 104 (or alternatively the trigger word may be a sound or sequence of sounds not audible to humans if the source of the commands is the display device 104). In this manner, the audio remote control device 122 is able to determine which audio source to de-enhance, and which audio source to enhance. For example, if the audio remote control device 122 determines the detected trigger word corresponds to the display device 104 (such that the display device 104 is the source of audio commands), then the audio remote control device 122 may operate in 302 and 304 of FIG. 3 to de-enhance audio from user 136, and operate in 306 and 308 of FIG. 3 to enhance audio from the display device 104.

In embodiments, the beam forming algorithms executed by the beam forming module 132 can be simplified because the display device 104 and the user 136 are typically at stable locations relative to the audio remote control device 122. That is, once initially positioned, the display device 104 and the audio remote control device 122 are typically not moved, or are moved by small amounts. Also, users 136 tend to watch the display device 104 from the same locations, so their locations relative to the audio remote control device 122 are also often stable.

Example Computer System

Figure 6:
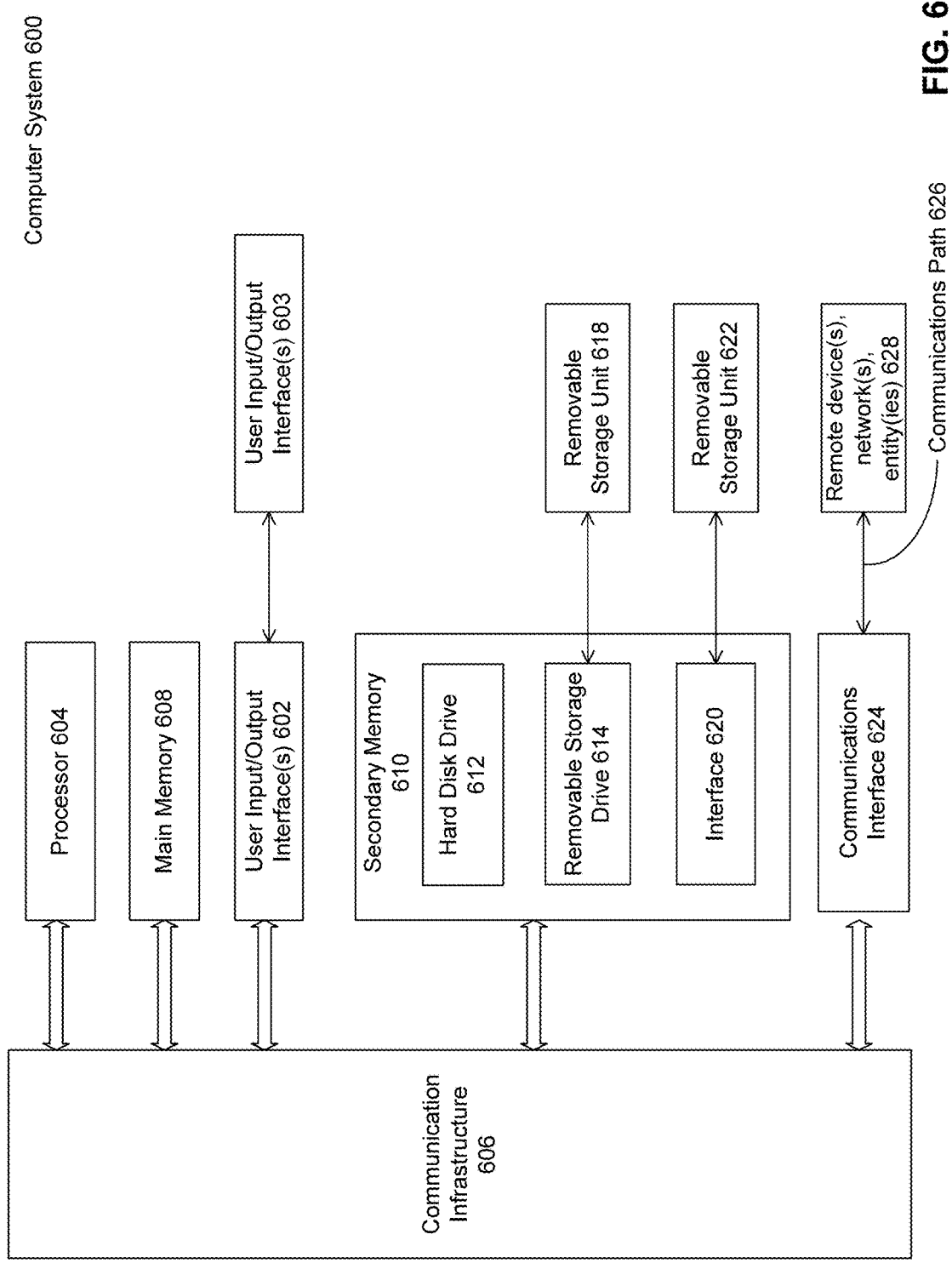
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 can be used to implement the operations of FIGS. 3-5.

Computer system 600 includes one or more processors (also called central processing units, or CPUs), such as a processor 604. Processor 604 is connected to a communication infrastructure or bus 606.

One or more processors 604 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In some embodiments, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A method of controlling a media device and a display device using audio commands, comprising:
   detecting, at an audio responsive control device, a trigger word in audio from a source of audio commands;
   determining, at the audio responsive control device, that a user is the source of audio commands based on the trigger word being associated with the audio responsive control device;
   determining, at the audio responsive control device, a position of the display device;
   de-enhancing, at the audio responsive control device, audio output by a speaker of the display device based on the position of the display device and the determination that the user is the source of audio commands;
   determining, at the audio responsive control device, a position of the source of audio commands;
   enhancing, at the audio responsive control device, the audio from the source of audio commands based on the determined position of the source of audio commands and the determination that the user is the source of audio commands;
   identifying, at the audio responsive control device, a command in the enhanced audio from the source of audio commands; and
   causing, at the audio responsive control device, at least one of the media device and the display device to operate according to the command.

2. The method of claim 1, further comprising:
   receiving, at the audio responsive control device, input identifying the position of the display device relative to a microphone array in the audio responsive control device, and the position of the source of audio commands relative to the microphone array.

3. The method of claim 1, the determining the position of the source of audio commands further comprising:
   identifying, at the audio responsive control device, a microphone in a microphone array in the audio responsive control device having a greatest signal strength when receiving the audio from the source of audio commands; and
   determining, at the audio responsive control device, the position of the source of audio commands based on the identified microphone.

4. The method of claim 3, wherein the enhancing the audio from the source of audio commands comprises:
   beam forming, at the audio responsive control device, an audio reception pattern of the identified microphone to improve receipt of the audio from the source of audio commands.

5. The method of claim 1, wherein the enhancing the audio from the source of audio commands comprises:
   beam forming, at the audio responsive control device, an audio reception pattern of a microphone in a microphone array proximate to the position of the source of audio commands to improve receipt of the audio from the source of audio commands.

6. The method of claim 1, wherein the de-enhancing the audio from the display device based on the position of the display device comprises at least one of:
   deactivating, at the audio responsive control device, one or more microphones in a microphone array in the audio responsive control device that are proximate to the position of the display device; and
   muting the audio from the speaker of the display device after receipt of the trigger word.

7. The method of claim 1, wherein the de-enhancing the audio from the display device based on the position of the display device comprises:
   beam forming, at the audio responsive control device, an audio reception pattern of a microphone in a microphone array that is proximate to the position of the display device to suppress receipt of the audio from the speaker of the display device.

8. The method of claim 1, wherein the de-enhancing the audio output by the speaker of the display device based on the position of the display device comprises:
   de-enhancing, at the audio responsive control device, the audio output by the speaker of the display device based on at least the trigger word in the audio from the source of audio commands.

9. The method of claim 1, wherein the enhancing the audio from the source of audio commands based on the position of the source of audio commands and the trigger word in the audio from the source of audio commands comprises:
   enhancing, at the audio responsive control device, the audio from the source of audio commands based on at least a trigger word type of the trigger word.

10. The method of claim 1, wherein the de-enhancing comprises:

receiving, via a network, an audio stream that is to be output by the speaker of the display device;

determining the audio output by the speaker of the display device matches the audio stream that is to be output by the speaker of the display device; and subtracting the audio stream that is to be output by the speaker of the display device from audio received by a microphone in a microphone array in the audio responsive control device.

11. An audio responsive control device to control a display device and a media server, comprising:

a memory; and at least one processor operatively coupled to the memory, the at least one processor configured to:

detect a trigger word in audio from a source of audio commands;

determine that a user is the source of audio commands based on the trigger word being associated with the audio responsive control device;

determine a position of the display device;

de-enhance audio output by a speaker of the display device based on a position of the display device and the determination that the user is the source of audio commands;

determine a position of a source of audio commands;

enhance audio from the source of audio commands based on the determined position of the source of audio commands and the determination that the user is the source of audio commands;

identify a command in the enhanced audio from the source of audio commands; and cause at least one of the media device and the display device to operate according to the command.

12. The audio responsive control device of claim 11, the at least one processor further configured to:

receive input identifying the position of the display device relative to a microphone array, and the position of the source of audio commands relative to the microphone array.

13. The audio responsive control device of claim 11, the at least one processor further configured to:

identify the trigger word in the audio from the source of audio commands; and identify a microphone in a microphone array having a greatest signal strength when receiving the audio from the source of audio commands; and determine the position of the source of audio commands based on the identified microphone.

14. The audio responsive control device of claim 13, wherein to enhance the audio from the source of audio commands the at least one processor is configured to:

beam form an audio reception pattern of the identified microphone to improve receipt of the audio from the source of audio commands.

15. The audio responsive control device of claim 11, wherein to enhance the audio from the source of audio commands the at least one processor is configured to:

beam form an audio reception pattern of a microphone in a microphone array proximate to the position of the source of audio commands to improve receipt of the audio from the source of audio commands.

16. The audio responsive control device of claim 11, wherein to de-enhance the audio from the display device based on the display device position the at least one processor is configured to:

deactivate one or more microphones in the microphone array that are proximate to the position of the display device.

17. The audio responsive control device of claim 11, wherein to de-enhance the audio from the display device based on the position of the display device the at least one processor is configured to:

beam form an audio reception pattern of a microphone in a microphone array that is proximate to the position of the display device to suppress receipt of the audio from the speaker of the display device.

18. A non-transitory, tangible computer-readable device having instructions stored thereon that, when executed by at least one computing device, cause the at least one computing device to perform operations comprising:

detecting a trigger word in audio from a source of audio commands;

determining that a user is the source of audio commands based on the trigger word being associated with the computing device;

determining a position of a display device;

de-enhancing audio output by a speaker of the display device based on a position of the display device and the determination that the user is the source of audio commands;

determining a position of a source of audio commands;

enhancing audio from the source of audio commands based on the determined position of the source of audio commands and the determination that the user is the source of audio commands;

identifying a command in the enhanced audio from the source of audio commands; and causing at least one of a media device and the display device to operate according to the command.

19. The non-transitory, tangible computer-readable device of claim 18, the operations further comprising:

identifying the trigger word in the audio from the source of audio commands;

identifying a microphone in a microphone array having a greatest signal strength when receiving the audio from the source of audio commands; and determining the position of the source of audio commands based on the identified microphone.

20. A method of controlling a media device and a display device using audio commands, comprising:

identifying a trigger word;

determining the trigger word is associated with the display device;

determining a position of a user;

de-enhancing audio from the user based on the position of the user;

determining a position of the display device;

enhancing audio from the display device based on the position of the display device;

identifying at least one command in the enhanced display device audio; and causing at least one of the media device and the display device to operate according to the at least one command.

* * * * *